United States Patent

Latham

[19]

[11] Patent Number: 5,859,645
[45] Date of Patent: Jan. 12, 1999

[54] METHOD FOR POINT SAMPLING IN COMPUTER GRAPHICS SYSTEMS

[75] Inventor: Roy Westlake Latham, Fremont, Calif.

[73] Assignee: Loral Corporation, Newport Beach, Calif.

[21] Appl. No.: 667,632

[22] Filed: Jun. 24, 1996

Related U.S. Application Data

[63] Continuation of Ser. No. 37,321, Mar. 26, 1993, abandoned.

[51] Int. Cl.$^6$ ........................................ G06T 5/00
[52] U.S. Cl. ................................................. 345/432
[58] Field of Search ........................ 395/118, 131, 395/132, 141, 142, 143; 345/418, 431, 432, 441, 442, 443

[56] References Cited

U.S. PATENT DOCUMENTS 5,239,624 8/1993 Cook et al. ................... 395/131 X

OTHER PUBLICATIONS

Mitchell, Dan P., "Spectrally Optimal Sampling for Distribution Ray Tracing", Computer Graphics, vol. 25, No. 4, Jul. 1991, pp. 157–162.

Primary Examiner—Mark K. Zimmerman
Attorney, Agent, or Firm—Douglas M. Clarkson

[57] ABSTRACT

A point sampling method for improving the images produced by a computer graphics system which uses quality measures together with a hill-climbing technique to generate an optimal rook placement of sample points. Two quality measures are used, the root-mean-square (rms) transition error and the maximal circle size. To derive the optimal rook placement, points are placed initially in any rook placement, such as along the diagonal of the pixel. New rook placements are generated by interchanging the x-coordinates of any pair of points. The optimal placement is determined by in a sequence of steps. At each step, all possible pair interchanges are tested by computing the quality measure for each of the possible interchanges. After all are evaluated, the sequence is concluded by making the interchange that provided the most improvement in the quality measure. The point placement after each interchange is used as the basis for the next step in the process. Each step follows the same procedure until no interchange improves the quality measure, or until the quality measure fails to be improved by at least a predetermined small increment.

8 Claims, 3 Drawing Sheets

METHOD FOR POINT SAMPLING IN COMPUTER GRAPHICS SYSTEMS

This is a continuation application Ser. No. 08/037,321, filed Mar. 26, 1993, now abandoned.

FIELD OF THE INVENTION

This invention relates to the field of computer graphics generally, and specifically, it relates to the field of point sampling of visual scene information for the purpose of generating an image of the visual scene.

BACKGROUND OF THE INVENTION

Computer graphic systems and real time simulation visual systems construct images of visual scenes. Each image is a rectangular array of pixels, and each pixel represents a small, typically square, region to which a single color or shade of gray is assigned.

Approximating a scene by an array of pixels can result in artifacts that degrade the quality of the resultant image. An important class of these artifacts is called "aliasing effects", and these effects are commonly known in the computer graphics industry. Aliasing effects result from selecting the wrong color to approximate a pixel due to incorrect sampling of the underlying image.

For example, a pixel area that corresponds to a region that is half white and half black should be approximated as being uniformly gray. Aliasing results if the pixel is colored entirely black or entirely white due to a failure to correctly sample and combine the underlying black and white regions.

Anti-aliasing is the process of reducing the undesirable effects of aliasing. Most methods rely upon "point sampling", which is the class of methods that involve computing discrete values of both color and intensity within each pixel of an image and, then, combining the samples into values to be displayed for each pixel. The quality of point sampling depends critically upon how the sample points are positioned within the pixel.

A text entitled *Principles of Interactive Computer Graphics* by Newman/Sproull (McGraw-Hill, 1979, 2nd Edition) provides an overview of the techniques. An article entitled *Spectrally Optimal Sampling for Distribution Ray Tracing* by Don P. Mitchell (Proceedings of SIGGRAPH '91 in Computer Graphics, 25, 4 of Jul. 1991, ACM SIGGRAPH, New York, 1991, pp. 157–162) provides a more specialized treatment.

Sample point positions are used for occlusion masks (or coverage masks). An "occlusion mask" is a means of summarizing which sample points in a pixel have been covered by one or more graphics primitives while rendering a computer graphics image.

Occlusion masks are used in several different ways in computer graphics systems, but all of the uses relate to improving the quality of the image by keeping track of pixel coverage at a sub-pixel level. Some computer graphics systems write objects into a frame buffer in reverse order of occlusion, i.e., the nearest objects are written first.

Occlusion masks are used also with z-buffering systems. An occlusion mask for a computer graphics system is a bit-map, wherein each bit represents each point in an array of points constrained within a rectangular boundary.

Because point sampling is used for both anti-aliasing and sub-pixel occlusion in a great variety of computer graphics systems, and because the image quality depends directly on the positions of the sample points, the method of point sampling is very important. The problem of finding a good method for selecting point samples is deceptively difficult.

One approach is to put the sample points in a rectangular array. Another approach is to place them at random in the pixel. Both of these approaches have strong drawbacks that degrade image quality.

Arranging sample points in a grid allows a small motion of a polygon between images in a sequence to cover an entire row, column, or diagonal of sample points. Thus, for example, if 16 points are placed in a 4 ×4 array, for many cases the result will only be as good as if four points were used.

The array is effective in covering small polygons. However, this advantage is strongly outweighed by the disadvantage of polygon edges covering a whole line of point samples at one time.

Placing points at random (or when a computer does the placement by a repeatable but apparently random process, pseudo-randomly), allows some placements to be quite poor, because points can be placed close together. A variation of random placement is to protect each sample with a region, a so-called Poisson Disk, within which no other point can be placed.

The Poisson Disk method does not work if the disks are too large, because placement becomes impossible. However, if the disks are small enough to ensure placement, the disadvantages of random placement reappear.

Another variation of random placement is a method by Cook et al. (U.S. Pat. No. 5,025,400) which is to use sample points that are pseudo-randomly distributed, and the best placement is selected by reference to the spectrum of the sampling frequency. A limitation of this method is that it does not guarantee optimal sampling in the horizontal and vertical directions.

Images typically have many horizontal and vertical edges corresponding to edges of buildings and other man-made structures, the horizon, and other features. Failure to treat horizontal and vertical edges well is a limitation of sampling with a grid and with many methods.

Yet another class of methods, known as rook placement, does guarantee optimal horizontal and vertical sampling. This method is named by analogy to rooks on a chessboard. Eight rooks can be placed on a chessboard so that no two are in the same row or column.

Similarly, "N" sample points can be placed at points within one N ×N grid within a pixel so that no two are in the same row and column. For example, one rook placement is to put all N samples on the diagonal of the N ×N grid.

Diagonal placement, like all rook placements, ensures N equally spaced horizontal and vertical samples. However, diagonal placement also is very poor placement for most other cases; polygon edges that happen to fall nearly parallel to the sampled diagonal receive little or no anti-aliasing.

While the rook placement concept has long been known to have great potential as a point sampling method, the problem of selecting specific rook placements has remained unsolved to this day. An overview of the problem is given by Mitchell in the 1991 SIGGRAPH paper, supra. Mitchell cites earlier work by Cook and by Shirley leading up to sampling arrangements in which a pixel is subdivided into an N ×N mesh, with N points placed in block centers so that no two are in the same row or column.

Mitchell goes on to say, "There seems to remain an important piece of unfinished business. We really do not know much about what constitutes a good sampling design versus a bad one."

OBJECTS AND SUMMARY OF THE INVENTION

Therefore, it is an object of this invention to provide a method for point sampling that is effective for generating high quality computer graphics imagery.

It is also an object of the present invention to provide a point sampling method that embodies uniform sampling along the horizontal and vertical axes, while meeting additional criteria for optimal sampling.

Another object of the invention is to provide a method that optimizes rook placements in the design of occlusion masks for computer graphics systems.

Briefly, a point sampling method for forming an image of pixels produced by a computer graphics system in accordance with the present invention provides electronic point sampling of at least one parameter relating to an object in a scene with a rook placement distribution of sample points. Then, according to the method of the invention, the sample point distribution is constrained so that a quality measure determines an optimal rook placement of the sample points.

More specifically, the method of the invention uses a rms (root-mean-square) transition error and a maximal circle size to generate an optimal rook placement of sample points.

The above and other objects, advantages and features of the present invention will become more apparent from the following detailed description of the presently preferred embodiment as it is illustrated in the accompanying drawings.

DETAILED DESCRIPTION OF THE INVENTION

Before proceeding with the description of the invention, a brief identification of some terminology to be used is in order. The "rms (root-mean-square) transition" error is a "measure" of error in the fractional coverage of a pixel by using the fraction of sample points coverage by a polygon having a single edge through the pixel, for all angles and locations of the edge in the pixel.

The "maximal circle" size is the diameter of the largest disk that can be placed among the sample points without covering any of the sample points. For both "measures", the smallest values correspond to the best sampling results.

First, an overview of the invention: to derive an optimal rook placement, points are placed initially in any rook placement, such as along the diagonal of the pixel. Then, new rook placements are generated by interchanging the x-coordinates of any pair of points.

The optimal rook placement is found by a sequence of steps. At each step, all possible pairs of interchanges are tried temporarily, and the "quality measure" is computed for each of the possible interchanges.

After all steps are evaluated, the effort is concluded by accepting the interchange that improves the quality measure the most. The rook placement with this interchange is used as the basis for the next step in the process.

Each step follows the same procedure until no interchange improves the quality measure, or until the quality measure fails to be improved by at least a predetermined small increment. A variation of this procedure is to derive a near optimal placement using the rms transition error as the quality measure, and then, switch to the maximal circle size measure.

The steps are allowed to proceed minimizing the circle size until the rms transition error is increased by a small fraction. Experience shows the circle size can be reduced significantly with little deterioration of the rms transition error.

Figures 1A, 1B, 1C:
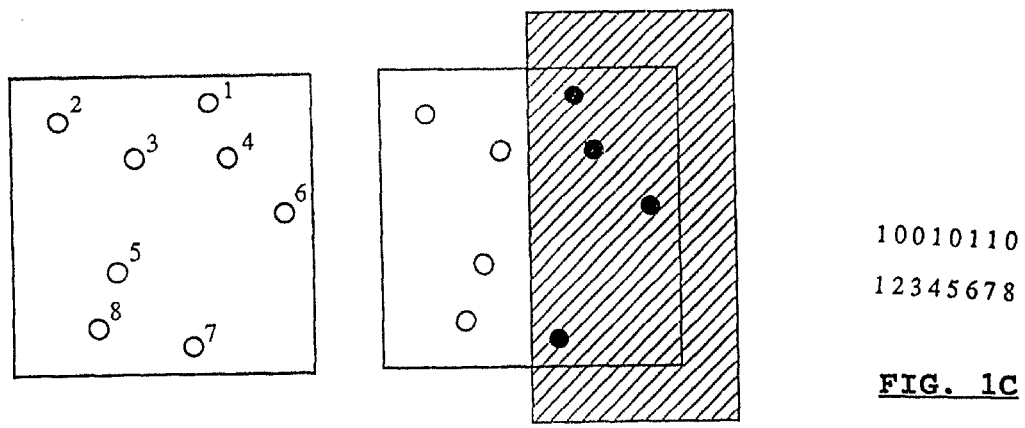
FIG. 1A shows an illustration of sample points within a pixel that are numbered to aid in the description to follow.
FIG. 1B is an illustration of the points as they are covered by a polygon as an aid in describing the invention.
FIG. 1C illustrates the points as they are associated with bits in an occlusion mask.
Figures 2A, 2B, 2C:
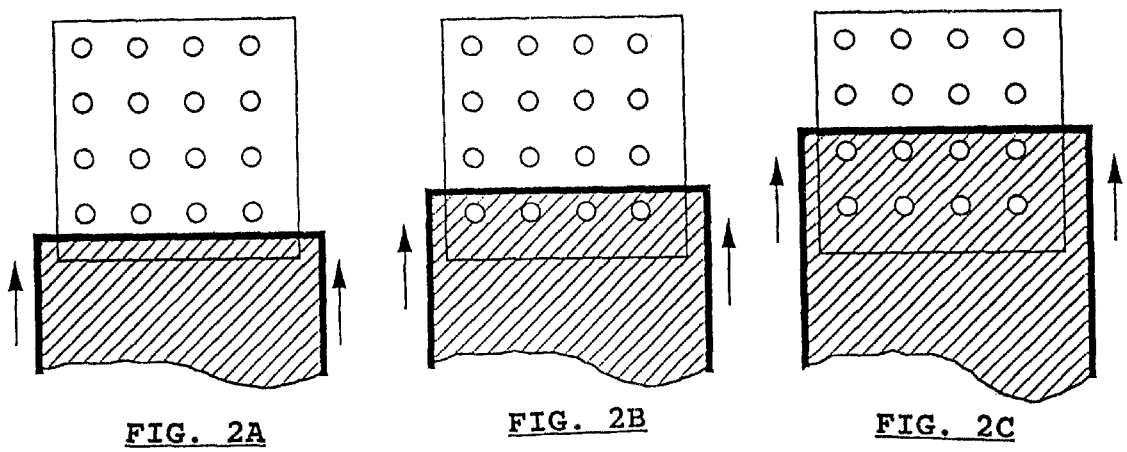
FIG. 2 shows four steps in FIG. 2A, FIG. 2B, FIG. 2C and FIG. 2D to increment coverage of 16 sample points in the occlusion mask, in accordance with the invention.
Figure 2D:
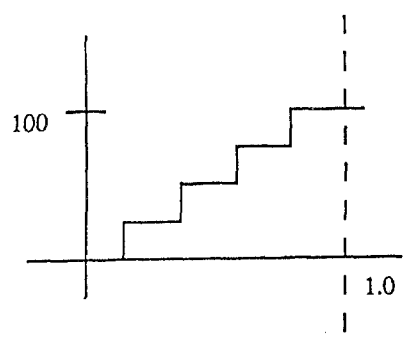

Now, with reference to FIG. 1, the problem solved by the invention concerns the mask as being a digital word, each bit of which is associated with a sample point within a pixel. In the illustrated example with reference to FIG. 2, despite there being 16 sample points in the occlusion mask, coverage is incremented with only four steps.

These step changes generally will prove to be a distracting artifact. Rather than increase the number of sample points, which increases system costs and computation time, the sample point pattern can be rearranged to minimize the artifacts.

Then, proceeding logically, determine the optimal arrangement of sample points. A solution can be said to be "best" only when "best" is defined carefully.

In other words, "best" is defined relative to a measure of quality. Therefore, it is essential to employ a meaningful quality measure to assure the design quality of an occlusion mask.

One measure of occlusion mask quality has been described already, supra: the number of step changes as a polygon having horizontal edge transitions vertically from covering none to all of the pixels. A refinement of that measure is the root-mean-square (rms) error in occlusion as the edge transitions over the pixel.

Ideally, the fraction of sample points covered would equal the fraction of the pixel area covered. In this limit as the number of sample points becomes infinite, many rook placement methods will drive this error to zero.

In most situations, horizontal and vertical edges are more important than other edge orientations, because man made and natural features tend to align with gravity or the horizon. It is suggested to weight the horizontal and vertical edges more heavily in quality metrics for such situations.

A non-directional measure will also be significant for almost all situations. The rms error is computed for each of many equal angular increments of the slope of the transitioning polygon edge. The average of these is the rms transition error.

Not all polygon (or other primitive) edges go all the way across a pixel. Edges may stop at a vertex within a pixel, or the entire primitive might be contained within the pixel. For example, sample points placed on the perimeter of a circle inscribed within the pixel produce good step-transition accuracy. However, the space in the middle of the circular arrangement could accommodate an object nearly one pixel across.

Figure 3:
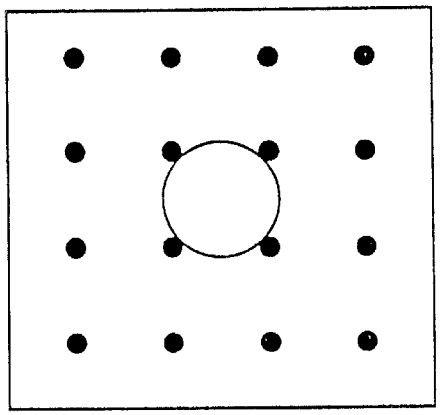
FIG. 3 is an illustration of one measure of mask quality as the diameter of a small circle that can fit among the sample points.

FIG. 3 illustrates that a quality measure is the size of the largest circle that can fit among the sample points with none in the interior. For this measure, the pattern repeats in neighboring pixels, so the circle is not constrained to lie entirely within the same pixel. The smaller the "largest" circle the better. The uniform array of sample points score best against this measure, which perhaps reflects its intuitive appeal.

In summary, there are no fewer than four quality measures that may be optimized:

(1) rms horizontal error;

(2) rms vertical error;

(3) rms transition error; and (4) maximum circle size.

Figure 4A:
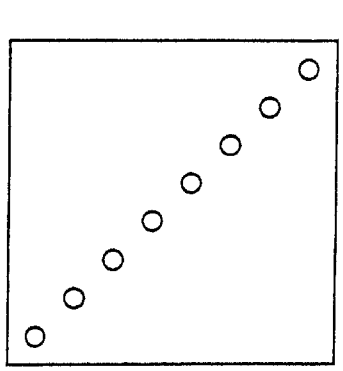
FIG. 4 illustrates in FIG. 4A, FIG. 4B and FIG. 4C the initial placement of sample points on the diagonal of a pixel in interchangeable columns to improve placement in accordance with the present invention.
Figure 4B:
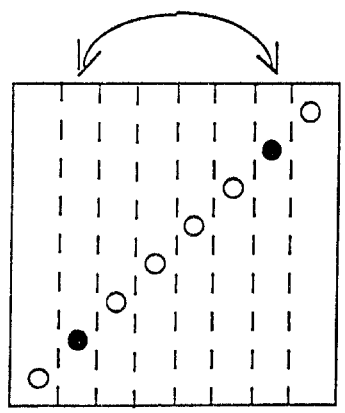
Figure 4C:
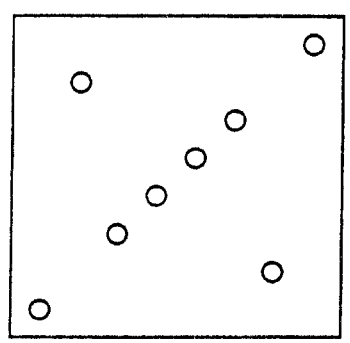

All rook placements, in which no two points are aligned horizontally or vertically, provide excellent results for horizontal and vertical edge transitions. Suppose all the sample points are spaced equally along a diagonal of the pixel, as illustrated in FIG. 4 of the drawings.

Like all rook placements, for N sample points there will be N equally spaced transitions for horizontally and vertically occluding edges. Also, there are N equally spaced transitions in the direction of the diagonal having all of the sample points. Of course, in the other diagonal direction, there is only one transition, the worst possible, and the largest circle will be slightly more than the square root of two in diameter.

However, if the y coordinates in any pair of the sample point coordinates are interchanged, the characteristic of having n equally spaced vertical and horizontal transitions is preserved. Moreover, the interchanges will improve the off-diagonal transitions, and the inserted circle measure, at some expense to the previously optimized diagonal.

If it is assumed that the sample points are placed in columns, the coordinate interchanges are equivalent to interchanging columns. Thus there are N rook placements available for consideration with other quality measurements. (The rotations of the columns all have equivalent quality, so that only (N−1! ) of the patterns need be considered.)

For small N, up to perhaps 10 or 12, it may be acceptable to search by exhaustion for the arrangement that maximizes a particular quality measure. At some point the computation time will become too large, and a directed search procedure must be used.

It is relatively straight forward to consider all the pairs of interchanges at any step of the search process, and it is relatively simple to make the interchange that provides the greatest improvement in the quality measure. In such efforts, however, care must be taken to avoid the search getting stuck at a local maximum. Changing the initial pattern, choosing a good initial pattern, and having secondary criteria for tie-breaking, all treat the problem of the search getting stuck.

Figure 5:
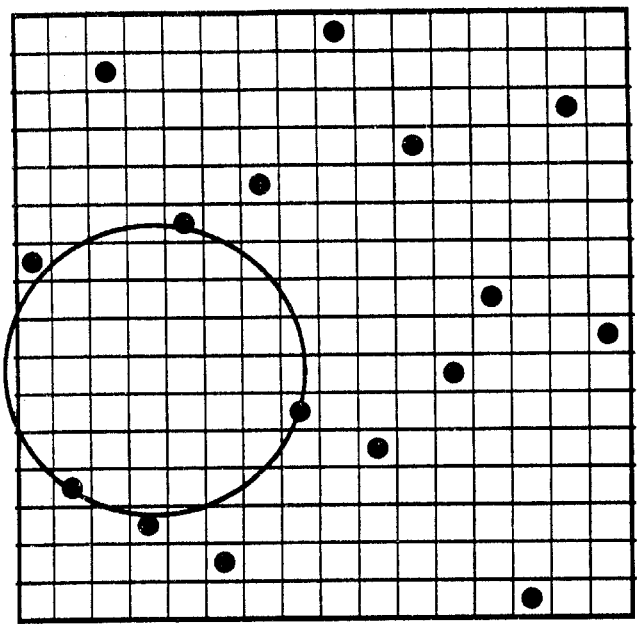
FIG. 5 is an illustration of optimal rook placement for N=16, illustrating the "largest" circle.

The sample point locations resulting from optimal rook placement for N=16 are tabulated below and plotted together with the largest circle. Ultimately, with reference to FIG. 5 of the drawings, an optimal rook placement can be derived and plotted.

TABLE 1

Results of optimal rook-placement for N = 16.

| X | Y | X | Y |
|---|---|---|---|
| 0.03125 | 0.40625 | 0.53125 | 0.03125 |
| 0.09375 | 0.78125 | 0.59375 | 0.71875 |
| 0.15625 | 0.09375 | 0.65625 | 0.21875 |
| 0.21875 | 0.84375 | 0.71875 | 0.59375 |
| 0.28125 | 0.34375 | 0.78125 | 0.46875 |
| 0.34375 | 0.90625 | 0.84375 | 0.96875 |
| 0.40625 | 0.28125 | 0.90625 | 0.15625 |
| 0.46875 | 0.84375 | 0.96875 | 0.53125 |

Various methods of placing sample points are compared to the above-described optimal placement method, and the results are summarized in Table 2, infra. For random placement of sample points, 25 different random placements are made, with the best determined according to rms transition error. For points to be in a circle, the circle with a diameter equal to N/(N+1) is selected, and the sample points are spaced equally around it to provide reasonable horizontal and vertical transition quality.

The optimal rook placement is iterated to the best rms transition error. While the optimal rook placement does not yield a unique placement, it permits the pattern to be rotated horizontally and vertically by increments of 1N to yield equivalent patterns.

Also, there are a number of alternative patterns within a few percent of each other that may be found depending upon the details of the hill-climbing algorithm. Numerical results of the quality comparisons are given in Table 2, infra.

Optimal rook placement produces the best results in terms of minimum horizontal and vertical error. The number of horizontal and vertical steps is proportional to the number of sample points for optimal rook placement, but it is proportional to the square root of the number of sample points for grid placement. Random placement and circle placement show similar square-root behavior, so that the advantage of optimal rook placement in minimizing vertical and horizontal errors increases with the number of sample points.

Random placement works poorly with respect to all of the metrics. One of the reasons that random placements works poorly is that there is nothing to prevent points from being placed very near each other. All the other methods ensure that the whole pixel will be covered with some uniformity.

A variation of random placement is the Poisson Disk method. The idea is to prevent random samples from falling too near each other by surrounding each sample with a "hard disk"within which no succeeding sample is allowed.

When the Poisson Disk method is used with variously sized hard disc regions, it will not work well consistently. With a small size disk (25% of the mesh spacing for the number of samples), the results will not be much better than random placement.

For larger disk sizes (75% of mesh spacing), roughly a third of the placements will fail before 16 points can be placed within the pixel, and the average results will improve. But bad instances of placements still occurred, and recomputing Poisson Disk placements for every pixel averages the quality but at great computational expense.

Grid placement yields both the minimum rms transition error and the minimum circle size. Unfortunately, the horizontal and vertical errors are generally unacceptable. The optimal rook placement is within 5% of the grid's transition error and circle size, and it solves the vertical and horizontal edge problem.

The optimal rook placement method also conveniently generalizes to an arbitrary number of sample points. Overall, the optimal rook placement method is best.

TABLE 2

Sample Placement Quality for Various Placement Methods.

| Placement type | rms (hor + vert)/2 | rms transition | max. circle diameter |
|---|---|---|---|
| Optimal Rook | 0.0181 | 0.0331 | 0.338 |
| Grid | 0.0721 | 0.0316 | 0.356 |
| Circle | 0.0665 | 0.0667 | 0.938 |
| Best of 25 Random | 0.0513 | 0.0460 | 0.521 |
| Best of 100 Poisson | 0.0384 | 0.0352 | 0.422 |
| Average Poisson | 0.0520 | 0.0499 | 0.447 |
| Worst of 100 Poisson | 0.0883 | 0.0799 | 0.474 |

The Poisson Disk diameter equals 75% of grid spacing. Tabulated errors are relative to the unit pixel area.

Figure 6:
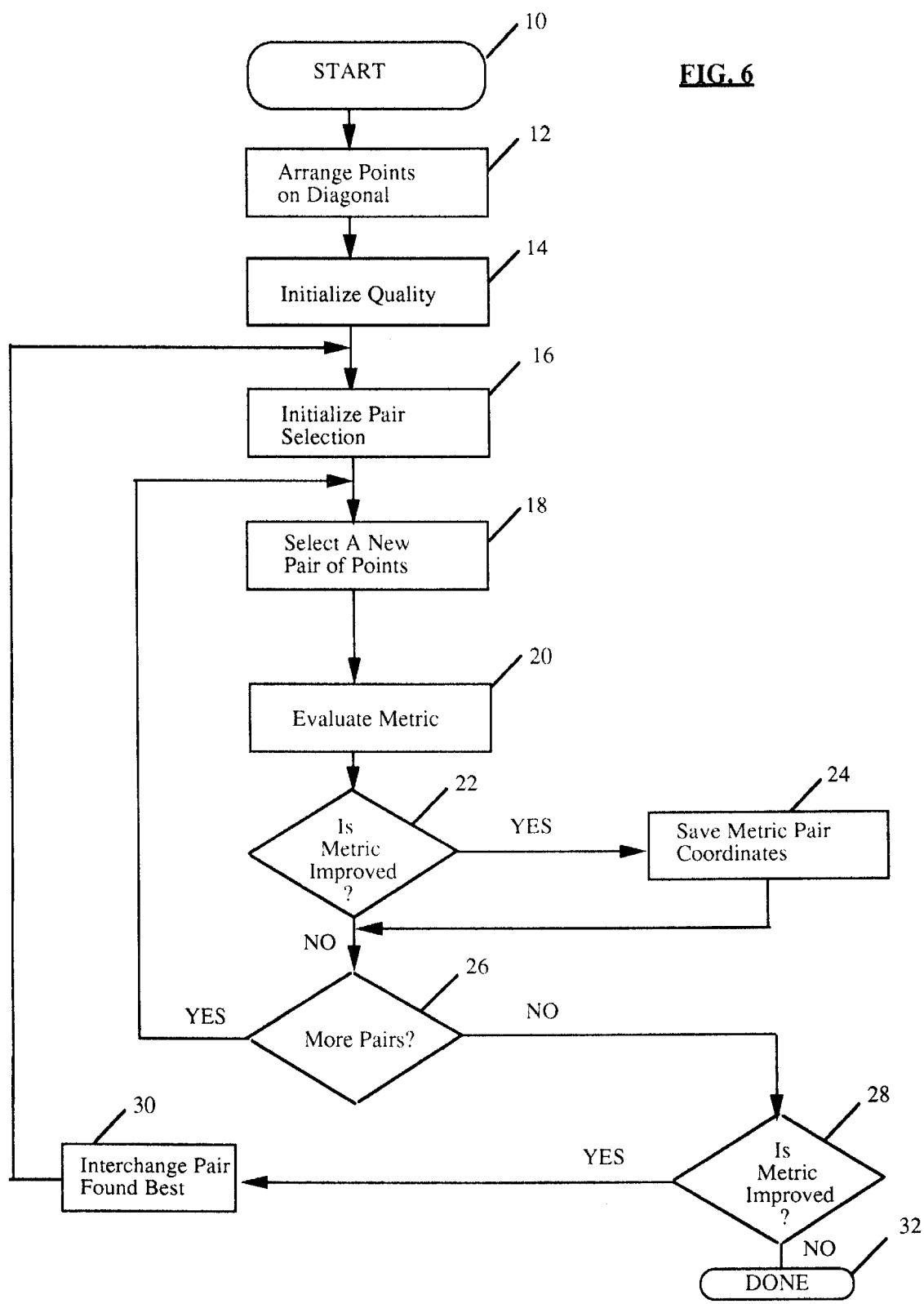
FIG. 6 is a flow diagram illustrating the method of invention.

Referring now to FIG. 6 of the drawings, the method for deriving point samples according to the present invention is described step by step. Starting at step 10, a rook placement is a one dimensional array of N numbers which represents the y coordinate of the sample point for each fixed x coordinate across the pixel.

Initially, in step 12, the y coordinates are placed along the diagonal of the pixel, so that the coordinates in the list increase uniformly. The quality of each placement is initialized in step 14 to a large value; for example, five times the pixel width.

In step 16, the process of selecting pairs of pixels is initialized, so that successive instances in the selection process in step 18 yields a new pair of x coordinate indices, until all the pairs have been considered, as detected later in step 26. For N sample points in the array, there will be N ×(N —1)/2 pairs selected before completion in detected at step 26.

After each pair is selected in step 18, the metric is evaluated in step 20, and the coordinates of each selected pair is interchanged temporarily and the metric (typically the rms transition error) is computed. Each pair, then, is changed back to the state in which it was at the start of the evaluation in step 20.

In step 22, if the metric just computed in step 20 is an improvement over all previously computed values of the metric, then in step 24, the coordinate pair is saved and the best value of the metric is updated.

The coordinate pair is saved in step 24. However, the values in the array are not interchanged in step 24.

In step 26, if there are more pairs to be evaluated, then, control returns to select a new pair in step 18. Eventually, all the pairs will have been evaluated, and control will be passed from step 26, to evaluate the metric improvement, step 28.

Having tried interchanging every pair of point locations by these successive steps and having evaluated the quality measure in step 20, step 28 is entered where either at least one of the interchanges yields an improvement, as indicated by step 24, or none of the interchanges yields an improvement.

If no interchange yields an improvement, the best placement has been found, the process is complete, and the results are indicated, printed or stored, indicated by step 32. However, if a single one of the interchanges made an improvement, then the pair is interchanged, step 30, before the pair selection process is re-initialized, as indicated by step 16, and seeking further improvements in the loop from the steps 18 through 26.

The process terminates in step 32 at a maximum of the quality measure. It is a possibility, only theoretical however, that the maximum is less than an absolute maximum. In practice, this is not a problem.

It is understood that the foregoing description is only illustrative of a preferred embodiment of the invention. Various alternatives and modifications can be devised by those skilled in the art without departing from the spirit and scope of the invention. While the invention has been described in a real time simulation environment, it is equally applicable to other types of computer graphics systems. Accordingly, the present invention is intended to embrace all such alternatives, variations and modifications that fall within the scope of the appended claims. pg,16

What is claimed is:

1. A method for forming an image of pixels from a database that specifies various parameters relating to objects in a scene, wherein characteristic information of each pixel is determined by point sampling of at least one point within a boundary of each pixel, the improvement comprising:

providing electronic point sampling of at least one of said parameters with a rook placement distribution of sample points; and constraining said distribution so that a quality measure is combined with a hill-climbing method of always proceeding towards obtaining an improvement in the quality measure to generate an optimal rook placement distribution of sample points.

2. The method according to claim 1 wherein said quality measure is from a class comprising root-mean-square transition error determination of sample points.

3. The method according to claim 1 wherein said quality measure is from a class comprising root-mean-square transition error.

4. The method according to claim 1 wherein said sample points are placed initially in any rook placement, and said optimal placement is generated by interchanging predetermined coordinates of pairs of points.

5. The method according to claim 4 wherein said predetermined coordinates are y coordinates.

6. A method for improving an image of pixels produced by a computer graphics system from a database that specifies various parameters relating to objects in a scene, wherein characteristic information of each pixel is determined by point sampling of predetermined points within a boundary of each pixel, the improvement comprising:

providing a rook placement distribution of sample points; and constraining said distribution using quality measures from a class including root-mean-square transition error with a hill climbing technique of proceeding toward improving said quality measures to generate an optimal rook placement distribution of sample points.

7. The method according to claim 6 wherein predetermined ones of said sample points are changed in pairs in a preselected sequence to determine optimal placement.

8. The method according to claim 7 wherein said sample point pairs that are changed according to said preselected sequence include all possible pair combinations.

* * * * *